US011881346B2

(12) United States Patent
Kang et al.

(10) Patent No.: US 11,881,346 B2
(45) Date of Patent: Jan. 23, 2024

(54) COIL ELECTRONIC COMPONENT

(71) Applicant: SAMSUNG ELECTRO-MECHANICS CO., LTD., Suwon-si (KR)

(72) Inventors: In Young Kang, Suwon-si (KR); Byeong Cheol Moon, Suwon-si (KR); Doo Ho Park, Suwon-si (KR); Tai Yon Cho, Suwon-si (KR); No Il Park, Suwon-si (KR); Seung Mo Lim, Suwon-si (KR); Tae Jun Choi, Suwon-si (KR); Jeong Hoon Ryou, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1125 days.

(21) Appl. No.: 16/530,407

(22) Filed: Aug. 2, 2019

(65) Prior Publication Data

US 2020/0350115 A1 Nov. 5, 2020

(30) Foreign Application Priority Data

May 3, 2019 (KR) ........................ 10-2019-0051942

(51) Int. Cl.
*H01F 5/00* (2006.01)
*H01F 27/29* (2006.01)
*H01F 27/28* (2006.01)

(52) U.S. Cl.
CPC ......... *H01F 27/29* (2013.01); *H01F 27/2823* (2013.01)

(58) Field of Classification Search
CPC ........................................................ H01F 27/29
(Continued)

(56) References Cited

U.S. PATENT DOCUMENTS

2003/0222335 A1* 12/2003 Hirano ................. H05K 3/3442 257/E29.022
2010/0007451 A1* 1/2010 Yan ....................... H01F 17/043 336/90

(Continued)

FOREIGN PATENT DOCUMENTS

JP 2007-165477 A 6/2007
JP 2013-098282 A 5/2013

(Continued)

OTHER PUBLICATIONS

English translation of JP2012060013 (Year: 2012).*
Korean Office Action dated Apr. 23, 2020 issued in Korean Patent Application No. 10-2019-0051942 (with English translation).

*Primary Examiner* — Ronald Hinson
(74) *Attorney, Agent, or Firm* — Morgan, Lewis & Bockius LLP

(57) ABSTRACT

A coil electronic component includes a body having one surface and the other surface, opposing each other, and a plurality of wall surfaces respectively connecting the one surface and the other surface of the body, first and second recesses, respectively formed in both end surfaces of the body opposing each other among the plurality of wall surfaces of the body, extending to the one surface of the body, a wound coil, embedded in the body, including first and second lead-out portions, a first external electrode disposed along an internal wall of the first recess and the one surface of the body and connected to the first lead-out portion, and a second external electrode disposed along an internal wall of the second recess and the one surface of the body and connected to the first lead-out portion. The first and second external electrodes are spaced apart from each other.

18 Claims, 13 Drawing Sheets

I-I'

(58) Field of Classification Search
USPC .......................................................... 336/200
See application file for complete search history.

(56) References Cited

U.S. PATENT DOCUMENTS

| | | | | |
|---|---|---|---|---|
| 2016/0086716 | A1* | 3/2016 | Choi | H01F 17/0013 427/127 |
| 2016/0126004 | A1 | 5/2016 | Yang et al. | |
| 2017/0032886 | A1 | 2/2017 | Kim et al. | |
| 2017/0103848 | A1* | 4/2017 | Yoneda | H01F 17/0013 |
| 2017/0125158 | A1 | 5/2017 | Shoda et al. | |
| 2017/0207018 | A1* | 7/2017 | Jung | H01F 27/2804 |
| 2018/0096783 | A1* | 4/2018 | Fukuda | H01F 27/366 |
| 2018/0182537 | A1* | 6/2018 | Shimizu | H01F 27/292 |
| 2019/0164676 | A1* | 5/2019 | Tsuduki | H01F 17/0033 |

FOREIGN PATENT DOCUMENTS

| | | | |
|---|---|---|---|
| JP | 2018-107346 | A | 7/2018 |
| KR | 10-1607026 | B1 | 3/2016 |
| KR | 10-2017-0014598 | A | 2/2017 |
| KR | 10-2017-0019439 | A | 2/2017 |

* cited by examiner

COIL ELECTRONIC COMPONENT

CROSS-REFERENCE TO RELATED APPLICATION(S)

This application claims benefit of priority to Korean Patent Application No. 10-2019-0051942 filed on May 3, 2019 in the Korean Intellectual Property Office, the disclosure of which is incorporated herein by reference in its entirety.

TECHNICAL FIELD

The present disclosure relates to a coil electronic component.

BACKGROUND

An inductor, a coil component, is a representative passive electronic component, used in electronic devices, together with a resistor and a capacitor. As electronic devices have been developed to have high performance and smaller sizes, electronic components, used in the electronic devices, are increasing in number and are decreasing in size.

An external electrode of a coil component is formed by applying a conductive paste or by a plating process. In the former case, a thickness of an external electrode is increased and thus, a thickness of a coil component may be increased. In the latter case, a plating resist required for plating should be prepared and, thus, the number of processes may be increased.

SUMMARY

An aspect of the present disclosure is to provide a coil electronic component having an external electrode shape appropriate for miniaturization. In the case of such a coil electronic component, the degree of coil pattern matching, efficiency in terms of manufacturing process, or the like, may be improved.

According to an aspect of the present disclosure, a coil electronic component includes a body having one surface and the other surface, opposing each other, and a plurality of wall surfaces respectively connecting the one surface and the other surface of the body, first and second recesses, respectively formed in both end surfaces of the body opposing each other among the plurality of wall surfaces of the body, extending to the one surface of the body, a wound coil, embedded in the body, including first and second lead-out portions, a first external electrode disposed along an internal wall of the first recess and the one surface of the body and connected to the first lead-out portion, and a second external electrode disposed along an internal wall of the second recess and the one surface of the body and connected to the first lead-out portion. The first and second external electrodes are spaced apart from each other.

The first electrode may be an integrated portion extending from the internal wall of the first recess and the one surface of the body, and the second electrode may be an integrated portion extending from the internal wall of the second recess and the one surface of the body.

Each of the first and second electronic components may extend over a bottom surface of the recess.

The first lead-out portion may be exposed from the body on the internal wall and the bottom surface of the first recess, and the second lead-out portion may be exposed from the body on the internal wall and the bottom surface of the second recess.

End portions, connected to the first and second external electrodes at the first and second lead-out portions, may have shapes corresponding to the first and second recesses, respectively.

The first and second lead-out portions may be connected to the first and second external electrodes on the first and second recesses, respectively.

At least one of the first and second lead-out portions may be bent to zigzag.

The wound coil may include a first coil integrated with the first lead-out portion and a second coil disposed below the first coil and integrated with the second lead-out portion.

The first lead-out portion may be bent downwardly to be connected to the first external electrode.

The coil electronic component may further include an insulating layers covering the one surface and the other surface of the body, respectively.

The insulating layer may not be disposed on the wall surface of the body.

An insulating layer among the insulating layers, covering the one surface of the body, may be disposed between the body and the first and second external electrodes.

The coil electronic component may further include an external insulating layer covering the other surface and the wall surface of the body.

The external insulating layer may cover all surfaces without covering the one surface of the body.

The external insulating layer may cover a region, formed in the recess, on the first and second external electrodes.

The coil electronic component may further include first and second plating layers, respectively disposed outside of the first and second external electrodes, covering the one surface of the body.

In a direction along which the one surface and the other surface oppose each other, the plurality of walls may be aligned with end surfaces of the first and second external electrodes, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

Various types of electronic components are used in an electronic device. Various types of coil components for removal of noise, or the like, may be appropriately used between such electronic components. For example, a coil electronic component may be used in an electronic component as a power conductor, a high-frequency (HF) inductor, a general bead, a GHz bead, a common mode filter, or the like.

Figure 1:
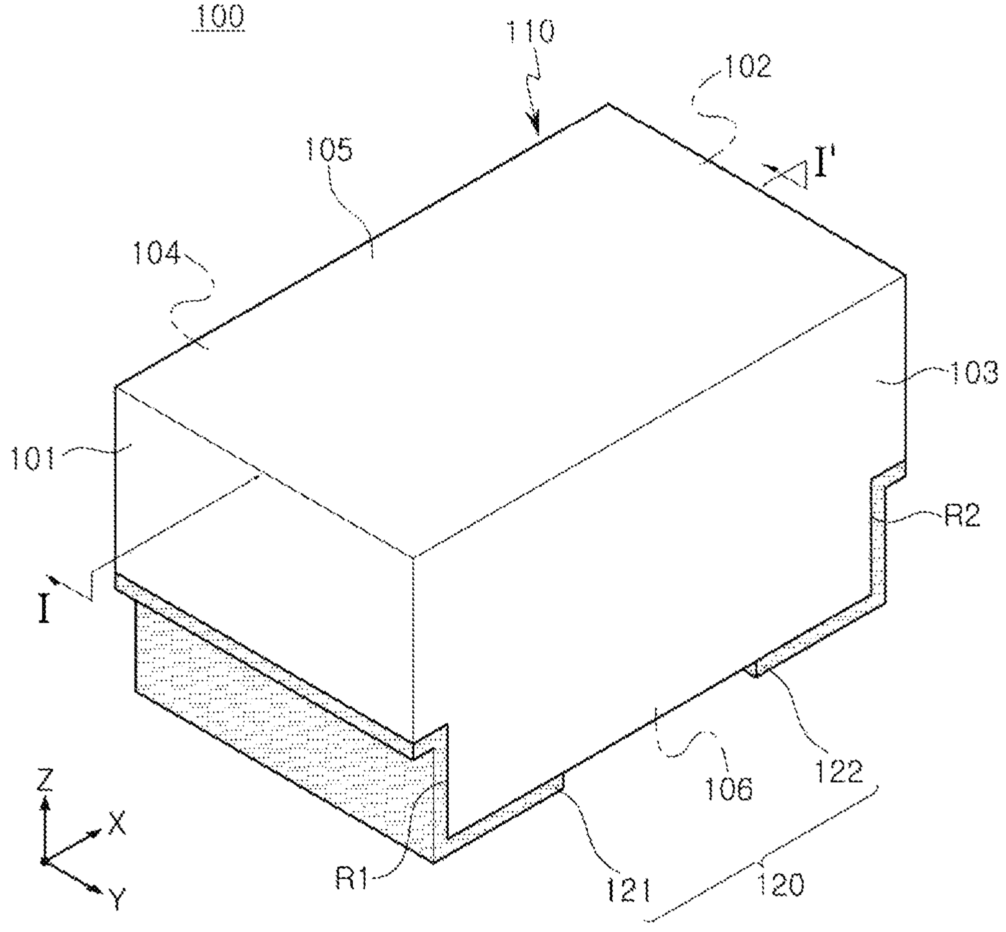
FIGS. 1 and 2 are schematic perspective views of a coil electronic component according to an example embodiment in the present disclosure.
Figure 2:
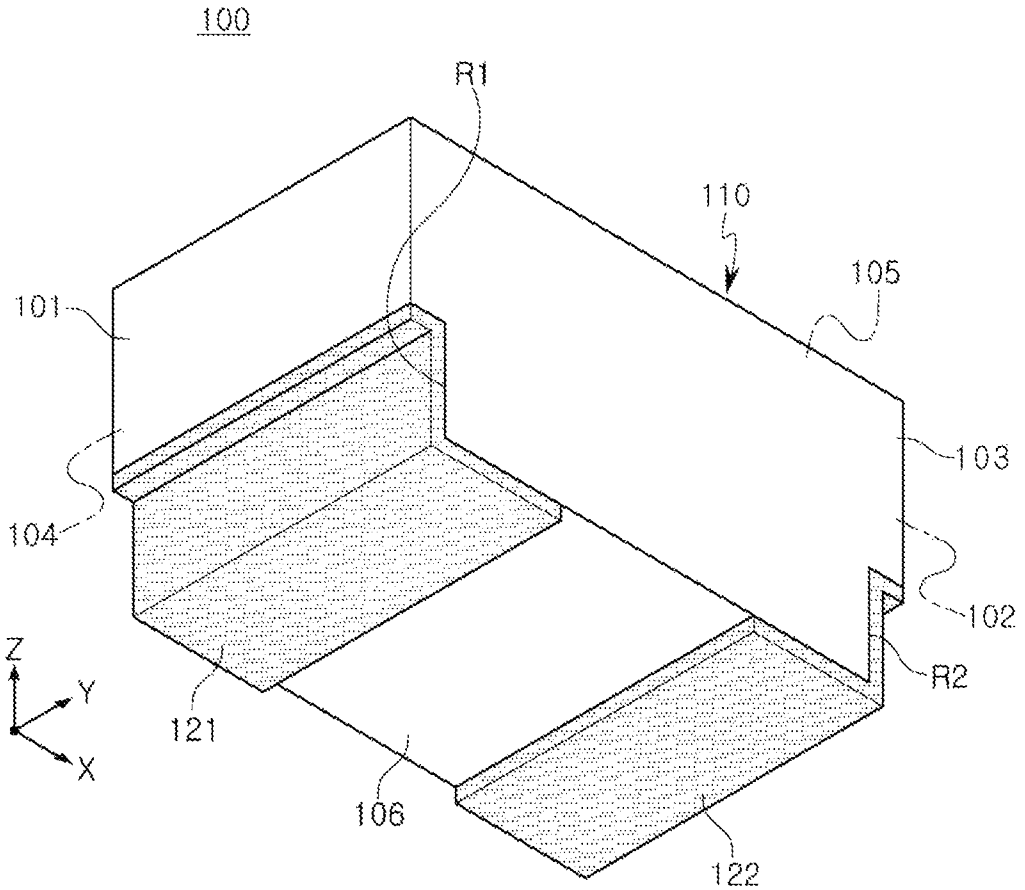
Figure 3:
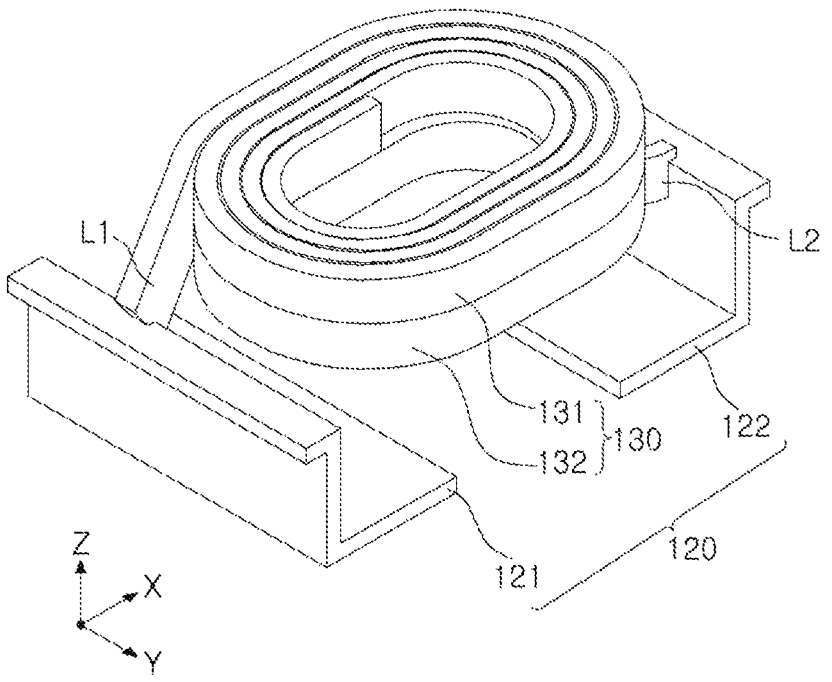
FIG. 3 is a schematic perspective view of a wound coil and an external electrode, which may be employed in the coil electronic component of FIG. 1.
Figure 4:
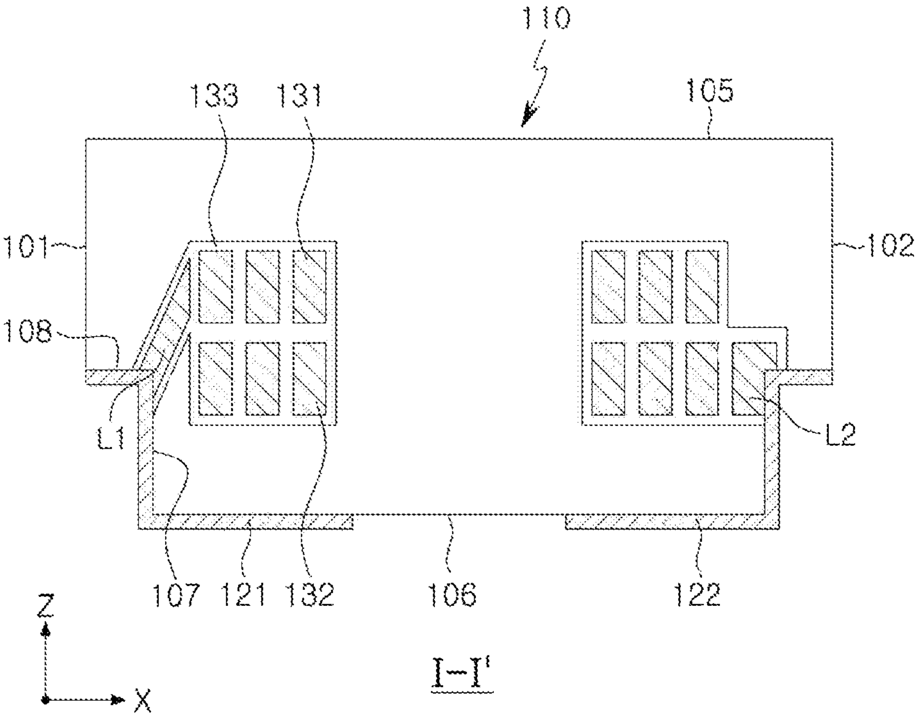
FIG. 4 is a cutaway cross-sectional view taken along line I-I' of FIG. 1.
Figure 5:
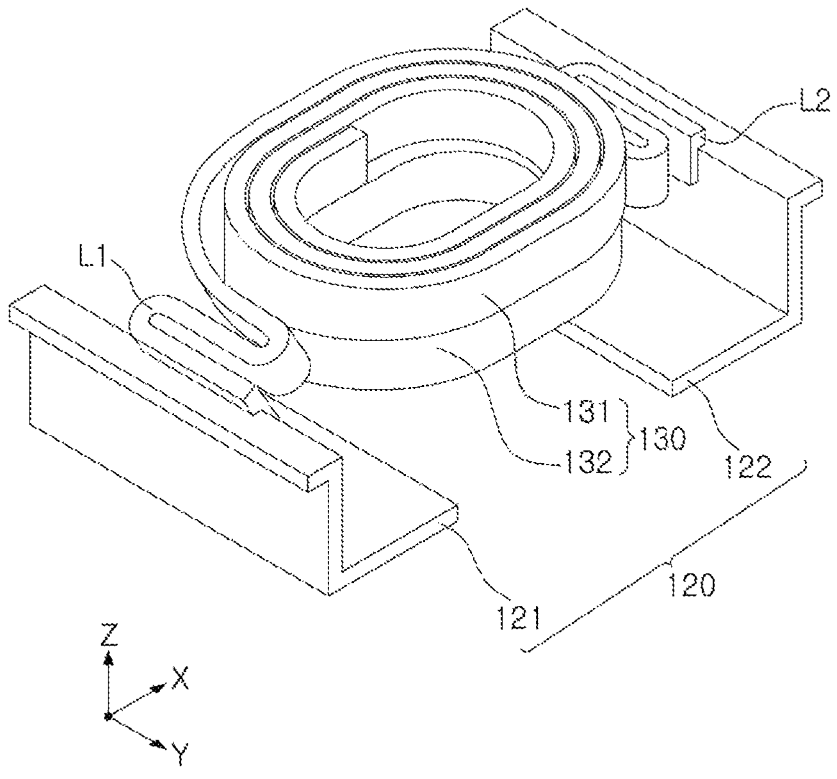
FIGS. 5 and 6 illustrate modified embodiments, respectively.
Figure 6:
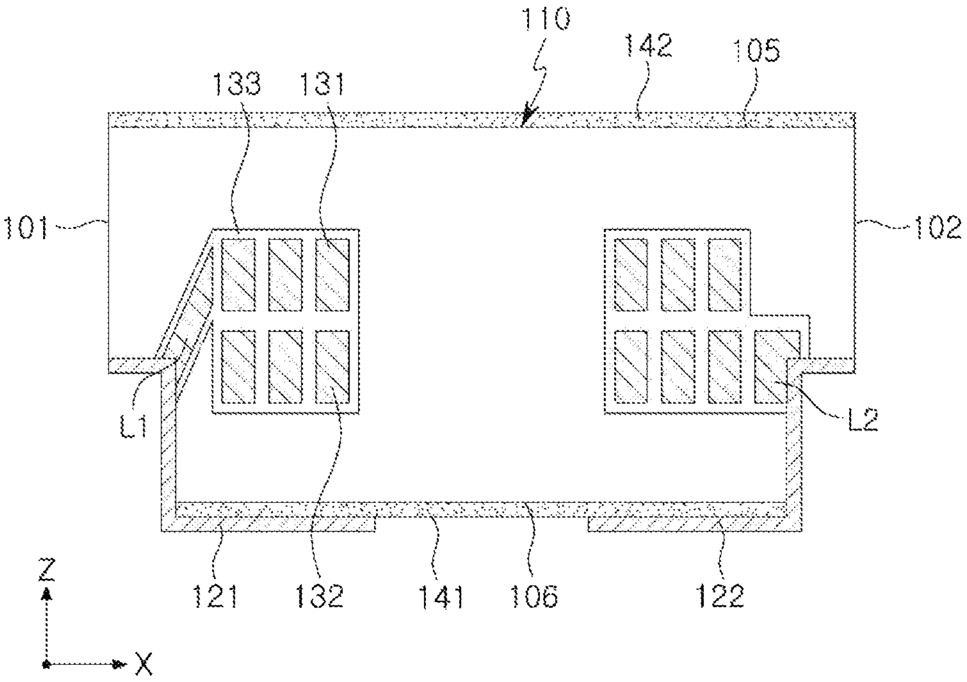

FIGS. 1 and 2 are schematic perspective views of a coil electronic component according to an example embodiment in the present disclosure. FIG. 3 is a schematic perspective view of a wound coil and an external electrode, which may be employed in the coil electronic component of FIG. 1. FIG. 4 is a cutaway cross-sectional view taken along line I-I' of FIG. 1. FIGS. 5 and 6 illustrate modified embodiments, respectively.

Referring to FIGS. 1 to 6, a coil electronic component 100 according to an example embodiment includes a body 110, having recesses R1 and R2 formed thereon, external electrodes 120, and a wound coil 130. The external electrodes 120 are disposed on the recesses R1 and R2 of the body 110, and are connected to lead-out portions L1 and L2 of the coil 130. Hereinafter, each component of the coil electronic component 100 will be described in detail.

The body 110 forms an exterior of the coil electronic component 100, and a coil 130 is embedded in the body 110. In this case, as illustrated in the drawings, the body 110 may be have an approximately hexahedral shape. The body 110 includes a first surface 101 and a second surface 102, opposing each other in a first direction X, a third surface 103 and a third surface 104 opposing each other in a second direction Y, and a fifth surface 105 and a sixth surface 106 opposing each other in a third direction Z. Each of the third and fourth surfaces 103 and 104 of the body 110 corresponds to a wall surface of a body 110 connecting the fifth surface 105 and the sixth surface 106 of the body 110 to each other. Hereinafter, both end surfaces of the body 110 will be respectively defined as the first end surface 101 and the second end surface 102 of the body 110, and both side surfaces of the body 110 will be respectively defined as the third surface 103 and the fourth surface 104 of the body 110. One surface and the other surface of the body 110, opposing each other in one direction, a Z direction, of the body 110, will be respectively defined as the sixth surface 106 and the fifth surface 105.

The body 110 may include a magnetic material and a resin. Specifically, the body 110 may be formed by laminating at least one magnetic composite sheet in which magnetic materials are dispersed in a resin. However, the body 110 may have a structure other than the structure in which the magnetic material is dispersed in the resin. For example, the body 110 may include a magnetic material such as ferrite. The magnetic may be ferrite or magnetic metal powder particles. Ferrite, included in the body 110, may be at least one of, for example, spinel type ferrites such as ferrites that are Mg—Zn-based, Mn—Zn-based, Mn—Mg-based, Cu—Zn-based, Mg—Mn—Sr-based, Ni—Zn-based, hexagonal ferrites such as ferrites that are Ba—Zn-based, Ba—Mg-based, Ba—Ni-based, Ba—Co-based, Ba—Ni—Co-based, or the like, garnet ferrites such as Y-based ferrite, and Li-based ferrite. Magnetic metal powder particles, included in the body 110, may include at least one selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may include at least one of pore ion power particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles. In this case, the metallic magnetic powder particles may be amorphous or crystalline. For example, the magnetic metal powder particles may be Fe—Si—B—Cr-based amorphous alloy powder particles, but is not limited thereto. Each of the ferrite and the magnetic metal powder particles may have an average diameter of about 0.1 μm to about 30 μm, but the average diameter is not limited thereto.

The body 110 may include two or more types of magnetic materials dispersed in a resin. The expression “different types of magnetic materials” refers to the fact that magnetic materials, dispersed in a resin, are distinguished from each other by any one of average diameter, composition, crystallinity and shape. The resin may include epoxy, polyimide, liquid crystal polymer, and the like, alone or in combination.

The recesses R1 and R2 are formed on the first and second surfaces 101 and 102 of the body 110 to extend to the sixth surface 106 of the body 110, respectively. For example, the first recess R1 is formed on the first surface 101 of the body 110 to extend to the sixth surface 106 of the body 110, and the second recess R2 is formed on the second surface 102 of the body 110 to extend to the sixth surface 106 of the body 110. Each of the first and second recesses R1 and R2 does not extend to the fifth surface 105 of the body 110. For example, the recesses R1 and R2 do not penetrate through the body 110 in a thickness direction (e.g., the third direction Z) of the body 110. The recesses R1 and R2 may extend to both side surfaces of the body 110, for example, the third and fourth surfaces 103 and 104, in a width direction (e.g., the second direction Y) of the body 110. Accordingly, the recesses R1 and R2 may be implemented in a slit shape formed in the entire width direction of the body 110. The recesses R1 and R2 may be formed by pre-dicing one surface of a coil bar along a boundary line, matching a width direction of each coil component, among boundary lines individualizing each coil component, in the coil which is in a state before individualization of each coil. Depth of the pre-dicing may be controlled such that the lead-out portions L1 and L2 to be described later are exposed to internal walls 107 and bottom surfaces 108 of the recesses R1 and R2. The internal walls 107 of the recesses R1 and R2 and the bottom surfaces 108 of the recesses R1 and R2 constitute a surface of the body 110. In this specification, for ease of description, the internal wall 107 and the bottom surface 108 of the recesses R1 and R2 will be distinguished from the surface of the body 110.

The wound coil 130 is embedded in the body 110 to exhibit the characteristics of a coil component. For example, when the coil electronic component 100 of this embodiment is used as a power inductor, the wound coil 130 may serve to stabilize power of an electronic device by storing an electric field as a magnetic field and maintaining an output voltage. The wound coils 130 include first and second lead-out out portions L1 and L2, which are connected to first and second external electrodes 121 and 122, respectively. In this case, the first and second lead-out portions L1 and L2 may be connected to the first and second external electrodes 121 and 122 on the recesses R1 and R2.

As illustrated in the drawings, the wound coil 130 may be formed by spirally winding a metal wire such as a copper wire having a surface coated with an insulating material 133.

The wound coil 130 may include a first coil 131, integrated with the first lead portion L1, and a second coil 132 integrated with the second lead portion L2. In this case, the second coil 132 may be disposed below the first coil 131, and the first and second coils 131 and 132 may be electrically connected to each other by a conductive via or the like. The first lead-out portion L1 may be bent downwardly to be connected to the first external electrode 121.

The external electrode 120 includes first and second external electrodes 121 and 122 respectively connected to the first and second lead-out portions L1 and L2. The first and second external electrodes 121 and 122 are disposed along the internal surfaces 107 of the recesses R1 and R2 and one surface, for example, the sixth surface 106 of the body 110, and are spaced apart from each other. The first and second external electrodes 121 and 122 are formed on the internal walls 107 of the recesses R1 and R2 and the sixth surface 106 of the body 110 in the form of a conformal layer. In this case, the first and second external electrodes 121 and 122 may be integrally formed on the internal wall 107 of the recesses R1 and R2 and the sixth surface 106 of the body 100, respectively. To this end, the first and second external electrodes 121 and 122 may be formed by a thin-film process such as a sputtering process.

The first and second external electrodes 121 and 122 may be formed of one selected from the group consisting of copper (Cu), aluminum (Al), silver (Ag), tin (Sn), gold (Au), nickel (Ni)), Chromium (Cr), titanium (Ti), or alloys thereof, and may be implemented in a multilayer structure.

As illustrated in the drawings, each of the first and second external electrodes 121 and 122 may extend to the bottom surfaces 108 of the recesses R1 and R2. Thus, contact areas between the electrodes 121 and 122 and the first and second lead-out portions L1 and L2 may be increased to improve bonding force therebetween. End portions, connected to the first and second external electrodes 121 and 122 at the first and second lead-out portions L1 and L2, may have shapes corresponding to the recesses R1 and R2, respectively. For example, in the third direction Z along which the fifth surface 105 and the sixth surface 106 oppose each other, the plurality of walls such as the first to fourth surfaces 101 to 104 are aligned with end surfaces of the first and second external electrodes 121 and 122, respectively. The shapes are appropriate for increase in contact areas between the lead-out portions L1 and L2 and the external electrode 120. In this case, as will be described later, a portion of the end portions of the lead-out portions L1 and L2 may be removed during formation of the recesses R1 and R2.

The coil electronic component 100 having the above-described structure may readily implement a bottom electrode structure while having an advantage in miniaturization.

Unlike a related-art case, for example, the external electrode 120 does not protrude from both end surfaces 101 and 102 or both side surfaces 103 and 104 of the body 110, such that a mounting area of the coil electronic component 100 may be reduced without increasing overall length and width of the coil electronic component 100. In addition, since the external electrode 120 is formed to have a relatively small thickness, the entire thickness of the coil component 100 may be reduced. In addition, the contact areas between the external electrode 120 and the lead-out portions L1 and L2 may be increased by the recesses R1 and R2, formed on the body 110, to improve structural stability and electrical characteristics. Moreover, as will be described later, the coil electronic component 100 having the above-described structure is appropriate for wafer-level manufacturing, and thus, improved productivity may be achieved and matching precision of a coil or the like may be improved.

Hereinafter, a coil electronic component according to a modified example embodiment will be described with reference to FIGS. 5 and 6. In a modified example of FIG. 5, first and second lead-out portions L1 and L2 may be bent zigzag to further increase contact areas between the lead-out portions L1 and L2 and the external electrodes 121 and 122. Although both the first and second lead-out portions L1 and L2 are illustrated as being bent in FIG. 5, only one of the first and second lead-out portions L1 and L2 may be bent, as necessary.

In a modified example of FIG. 6, insulating layers 141 and 142 are additionally disposed to cover a sixth surface 106 and a fifth surface 105 of a body 110. In this case, as illustrated in the drawing, the insulating layers 141 and 142 may not be disposed on wall surfaces 101, 102, 103, and 104 of the body 110. This is because the wall surfaces 101, 102, 103, and 104 of the body 110 may be exposed by cutting when dicing is performed in units of components. The insulating layers 141 and 142 may effectively protect the body 110 and may further improve insulating properties between the body 110 and external electrodes 121 and 122 when metallic magnetic particles are contained in the body 110. Of the insulating layers 141 and 142, the insulating layer 141, disposed to cover one surface (a bottom surface) of the body, may be disposed more closely to the body 110 than the first and second external electrodes 121 and 122. For example, the insulating layer 141 may be disposed between the body 110, and the first and second external electrodes 121 and 122. The insulating layers 141 and 142 may be formed using any material and process known in the art as long as they may perform such insulating functions. For example, the insulating layers 141 and 142 may be formed using a method of coating an insulating resin, a method of depositing an oxide, or the like.

Hereinafter, a method of manufacturing a coil electronic component and examples of structures, obtained from the method, will be described with reference to FIGS. 7 to 13. The method of manufacturing a coil electronic component will focus on a process of forming a recess in a body and a process of connecting an external electrode to a lead-out portion.

Figure 7:
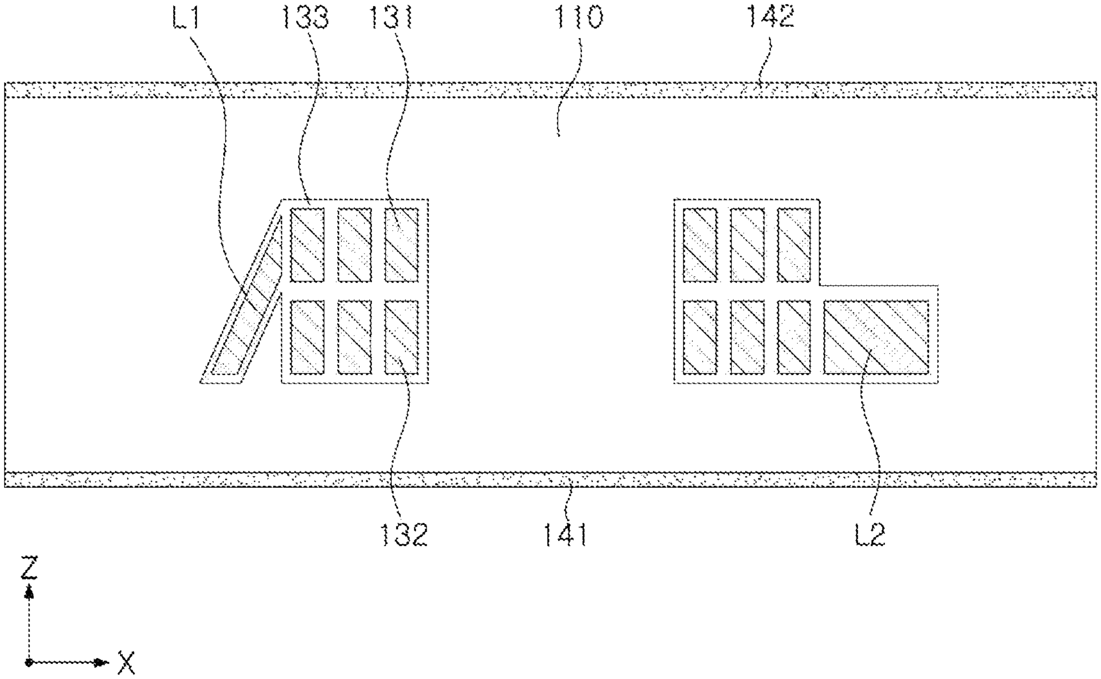
FIGS. 7 to 13 illustrate an example of a method of manufacturing a coil electronic component.

As illustrated in FIG. 7, a wound coil is provided with first and second coils 131 and 132, and a body 110 is formed to encapsulate the wound coil. The body 110 may be formed by laminating a plurality of composites of a magnetic material and a resin and compressing and curing the laminated composites. Insulating layers 141 and 142 may be formed on one surface (a bottom surface on the basis of FIG. 7) and the other surface (a top surface on the basis of FIG. 7) of the body 110 by a method such as appropriate coating, vapor deposition, or the like. Lead-out portions L1 and L2 are disposed in a predetermined region to be exposed by a recess formed by a process to be described later. To this end, the lead-out portions L1 and L2 may be bent, as necessary.

Figure 8:
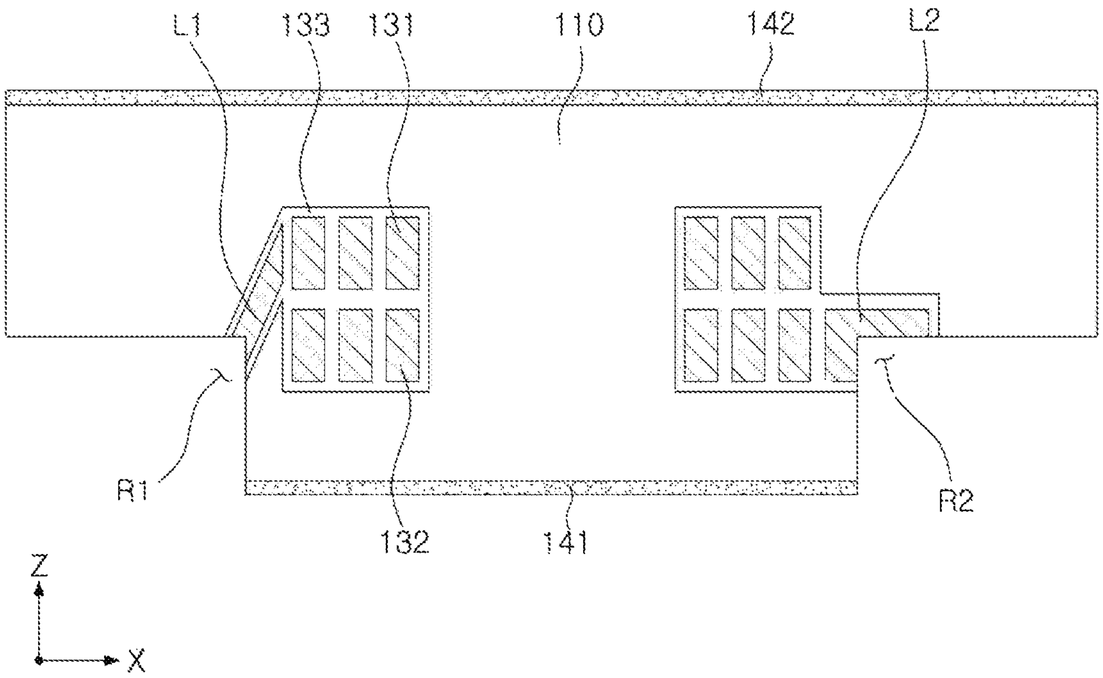

Next, as illustrated in FIG. 8, a portion of the body 110 is removed to form recesses R1 and R2 in the body 110. In this process, a portion of the lead-out portions L1 and L2, or the like, may also be removed. The body 110 may be partially diced to form the recesses R1 and R2. Thus, the lead-out portions L1 and L2 may be exposed.

Figure 9:
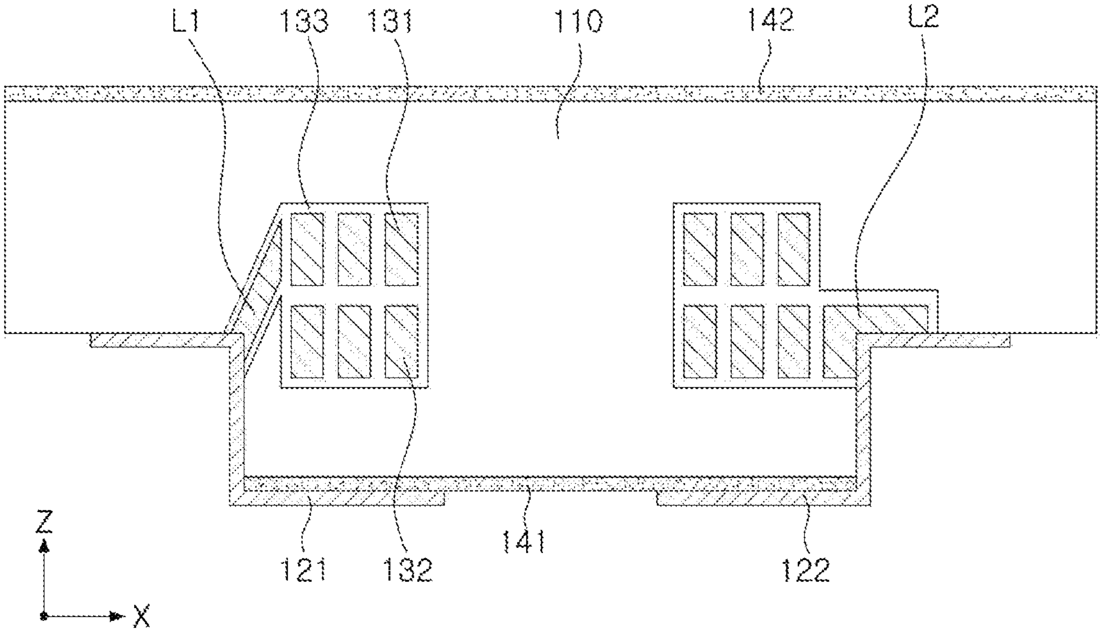

Next, as illustrated in FIG. 9, first and second external electrodes 121 and 122 are formed. The first and second external electrodes 121 and 122 may be formed on a surface of the body 110 in regions, corresponding to the recesses R1 and R2, and may be connected to the first and second lead-out portions L1 and L2, respectively. Each of the first and second external electrodes 121 and 122 may extend from one side, for example, the bottom surface of the body 110 and may form a bottom electrode structure. As described above, the first and second external electrodes 121 and 122 may be implemented by sputtering a material such as copper (Cu) or the like. To this end, a mask pattern may be formed on the surface of the body 110.

Figure 10:
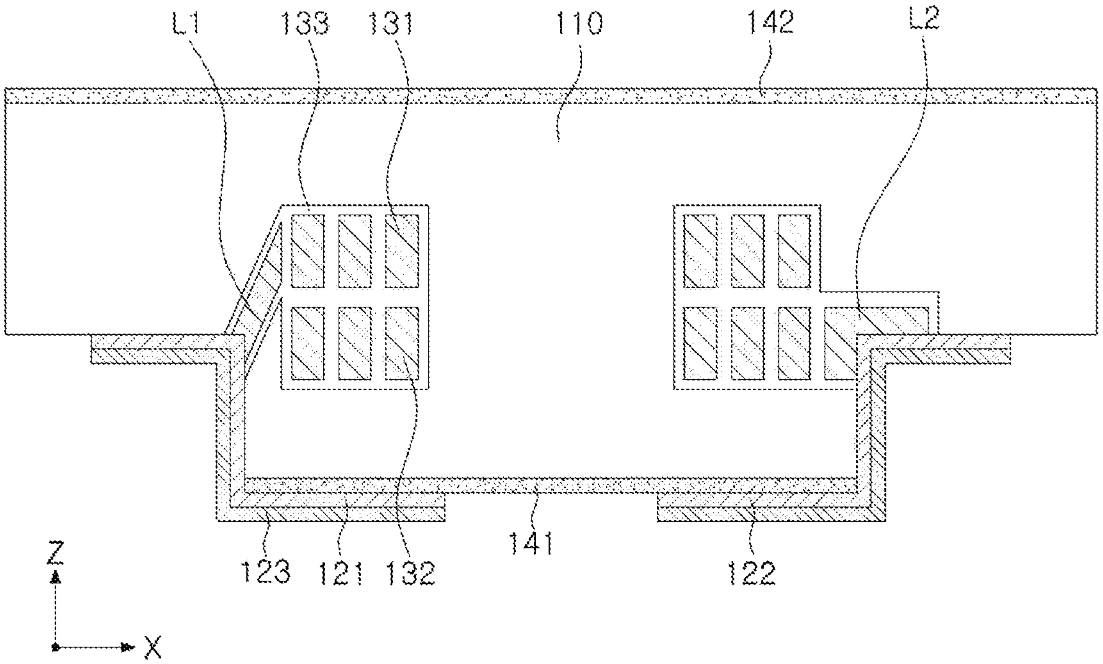

As necessary, a plating layer may be additionally formed on surfaces of the first and second external electrodes 121 and 122. Specifically, as illustrated in FIG. 10, first and second plating layers 123 and 124 are formed to cover the first and second external electrodes 121 and 122, respectively. The first and second plating layers 123 and 124 may include nickel (Ni), tin (Sn), gold (Au), and the like, and may be implemented in a laminated structure thereof.

Figure 11:
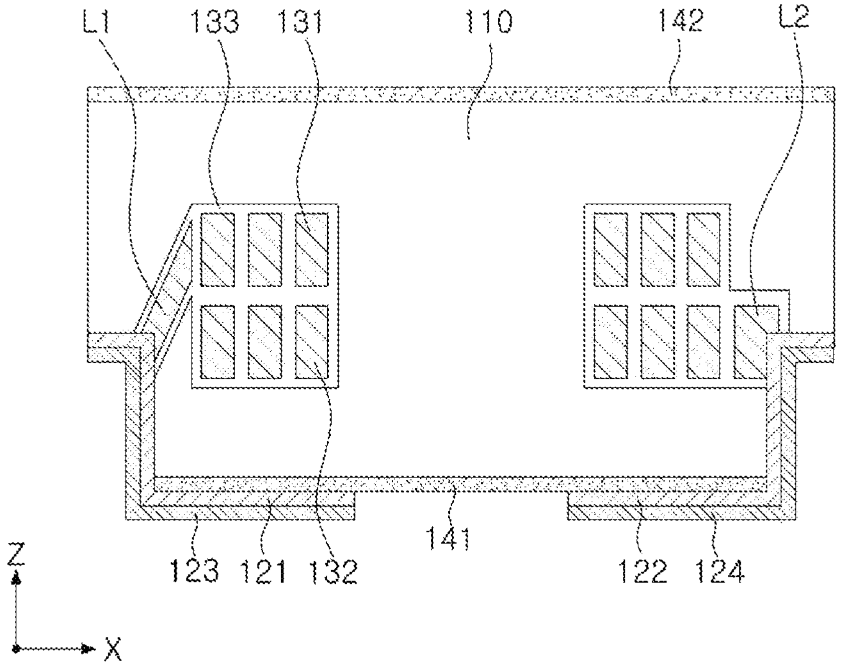
Figure 12:
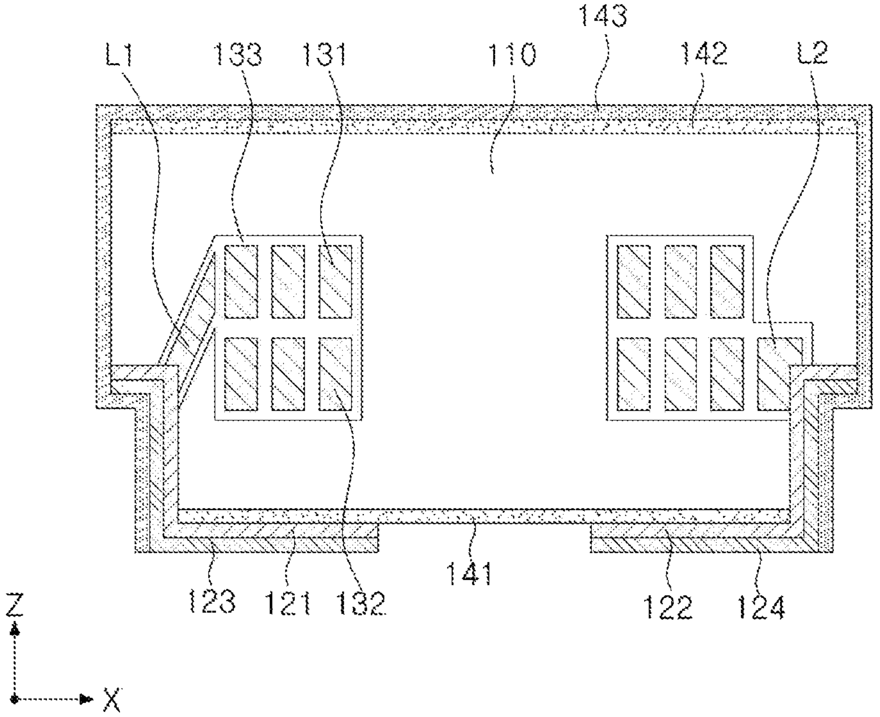
Figure 13:
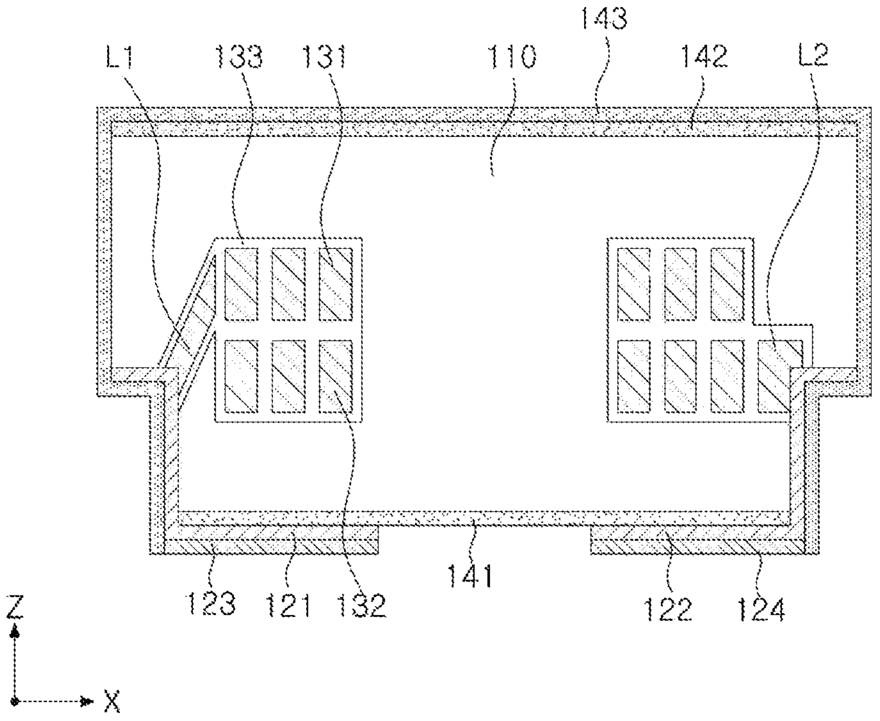

Next, as illustrated in FIG. 11, full dicing is performed to cut first and second plating layers 123 and 124 in units of components. In this case, in the third direction Z along which the fifth surface 105 and the sixth surface 106 oppose each other, the plurality of walls such as the first to fourth surfaces 101 to 104 are aligned with end surfaces of the first and second external electrodes 121 and 122, respectively. As necessary, an external insulating layer 143 may be then formed to protect the body 110, the external electrodes 121 and 122, and the like. The external insulating layer 143 may include, for example, a solder resist component, and may be formed by a method such as spray coating, vapor deposition, or the like.

The external insulating layer 143 covers the other surface (a top surface) and wall surfaces (side surfaces) of the body 110. In this case, the external insulating layer 143 may cover all surfaces except for one surface (a bottom surface) of the body 110 without covering one surface of the body 110. The external insulating layer 143 may be formed to cover regions formed in the recesses R1 and R2 on the first and second external electrodes 121 and 122.

In this embodiment, the first and second plating layers 123 and 124 are fully diced, following formation of the first and second plating layers 123 and 124. However, the order of the processes may be changed, and thus, a structural difference may occur. Specifically, after the first and second external electrodes 121 and 122 are formed and fully diced, the external insulating layer 143 may be formed. Then, the first and second plating layers 123 and 124 may be formed on a power portion of the component to implement a coil electronic component having a bottom surface electrode structure. The first and second plating layers 123 and 124 may be disposed outside of the first and second external electrodes 121 and 122 to cover one side (the bottom surface) of the body 110, respectively.

As described above, a coil electronic component according to an example embodiment may have an external electrode shape appropriate for miniaturization. Moreover, a matching degree of a coil pattern and efficiency in a manufacturing process may be improved.

While example embodiments have been shown and described above, it will be apparent to those skilled in the art that modifications and variations could be made without departing from the scope of the present disclosure as defined by the appended claims.

What is claimed is:

1. A coil electronic component comprising:

a body having one surface and the other surface opposing each other, first and second end surfaces respectively connecting the one surface and the other surface of the body and opposing each other, and first and second side surfaces respectively connecting the one surface, the other surface, and the first and second end surfaces of the body and opposing each other;

a first recess recessed in the first end surface of the body, and extending to the one surface and each of the first and second side surfaces of the body;

a second recess recessed in the second end surface of the body, and extending to the one surface and each of the first and second side surfaces of the body;

a wound coil, embedded in the body, including first and second lead-out portions;

a first external electrode disposed along an internal wall of the first recess and the one surface of the body and connected to the first lead-out portion; and a second external electrode disposed along an internal wall of the second recess and the one surface of the body and connected to the second lead-out portion, wherein the first external electrode and the second external electrode are spaced apart from each other, and the first lead-out portion extends to the internal wall and a bottom surface of the first recess, such that on the internal wall and the bottom surface of the first recess, the first lead-out portion is in contact with the first external electrode.

2. The coil electronic component of claim 1, wherein the first external electrode is an integrated portion extending from the internal wall of the first recess and the one surface of the body, and the second external electrode is an integrated portion extending from the internal wall of the second recess and the one surface of the body.

3. The coil electronic component of claim 1, wherein the second lead-out portion extends to the internal wall and a bottom surface of the second recess.

4. The coil electronic component of claim 3, wherein on the internal wall and the bottom surface of the second recess, the second lead-out portion is in contact with the second external electrode.

5. The coil electronic component of claim 1, wherein end portions, connected to the first and second external electrodes at the first and second lead-out portions, have shapes corresponding to the first and second recesses, respectively.

6. The coil electronic component of claim 1, wherein at least one of the first and second lead-out portions is bent to zigzag.

7. The coil electronic component of claim 1, wherein the wound coil comprises:

a first coil integrated with the first lead-out portion; and a second coil disposed below the first coil and integrated with the second lead-out portion.

8. The coil electronic component of claim 7, wherein the first lead-out portion is bent downwardly to be connected to the first external electrode.

9. The coil electronic component of claim 1, further comprising:

insulating layers covering the one surface and the other surface of the body, respectively.

10. The coil electronic component of claim 9, wherein the insulating layers are spaced apart from one or more of the first and second end surfaces and the first and second side surfaces of the body.

11. The coil electronic component of claim 9, wherein an insulating layer among the insulating layers, covering the one surface of the body, is disposed between the body and the first and second external electrodes.

12. The coil electronic component of claim 1, further comprising:

an external insulating layer covering the other surface and one or more of the first and second end surfaces and the first and second side surfaces of the body.

13. The coil electronic component of claim 12, wherein the external insulating layer covers all surfaces without covering the one surface of the body.

14. The coil electronic component of claim 12, wherein the external insulating layer covers a region, disposed in the recess, on the first and second external electrodes.

15. The coil electronic component of claim 14, further comprising:

first and second plating layers, respectively disposed outside of the first and second external electrodes, covering the one surface of the body.

16. The coil electronic component of claim 1, wherein in a direction along which the one surface and the other surface oppose each other, the first end surface and the first and second side surfaces are aligned with end surfaces of the first external electrode, respectively, and the second end surface and the first and second side surfaces are aligned with end surfaces of the second external electrode, respectively.

17. The coil electronic component of claim 1, wherein the first external electrode includes first to third portions connected to each other, and the first portion of the first external electrode is disposed on the one surface of the body to protrude from the one surface of the body, the second portion of the first external electrode is bent from the first portion of the first external electrode and is disposed on the internal wall of the first recess, and the third portion is bent from the second portion of the first external electrode and is disposed on the bottom surface of the first recess.

18. The coil electronic component of claim 17, wherein an end surface of the third portion of the first external electrode is flushed with the first end surface of the body.

* * * * *